DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1363

T889,008

PROCESSES OF TREATING TEXTILES, TEXTILE TREATING COMPOSITIONS, AND IMPROVED TEXTILES

Kurt W. Masurat, Preston R. Savage, and Richard L. West, Wilmington, Del., assignors to Atlas Chemical Industries, Inc., Wilmington, Del.

Filed May 21, 1970, Ser. No. 39,573
Int. Cl. D06m *13/40*
U.S. Cl. 252—8.8
No Drawing. 17 Pages Specification

Textile materials are provided which have a high degree of lubricity or softness and a low-soilage index. Disclosed is a process for providing a lubricating and low-soiling finish to textile materials which process comprises applying to a textile material a compound characterized by the generalized formula

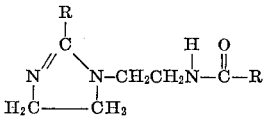

wherein R is an alkyl group containing from 11 to 21 carbon atoms. Also disclosed are textile treating compositions comprising a compound of the above formula, water, acetic acid, and propanol.